(12) United States Patent
Sedoni et al.

(10) Patent No.: US 6,523,453 B2
(45) Date of Patent: Feb. 25, 2003

(54) HYDRAULIC CONTROL VALVE FOR AGRICULTURAL IMPLEMENTS

(75) Inventors: Enrico Sedoni, Modena (IT); Gabriele Balboni, San Felice Sul Panaro (IT)

(73) Assignee: New Holland North America, Inc., New Holland, PA (US)

( * ) Notice: Subject to any disclaimer, the term of this patent is extended or adjusted under 35 U.S.C. 154(b) by 86 days.

(21) Appl. No.: 09/792,370

(22) Filed: Feb. 23, 2001

(65) Prior Publication Data

US 2001/0035091 A1 Nov. 1, 2001

(30) Foreign Application Priority Data

Mar. 3, 2000 (IT) .................................. BO2000A000111

(51) Int. Cl.[7] ............................................... F15B 11/08
(52) U.S. Cl. ...................... 91/447; 137/596.2; 251/294
(58) Field of Search ................... 91/445, 447; 251/294; 137/596.2, 624.27, 625.69

(56) References Cited

U.S. PATENT DOCUMENTS 3,595,271 A * 7/1971 Nelson .................... 137/596.2
3,931,746 A * 1/1976 Hansen ...................... 180/89.1
4,047,587 A * 9/1977 Anstey ........................ 180/315
4,235,415 A * 11/1980 Heckenkamp ........... 137/596.1
6,328,068 B1 * 12/2001 Jacobson ............... 137/625.69

* cited by examiner

*Primary Examiner*—Edward K. Look
*Assistant Examiner*—Igor Kershteyn
(74) *Attorney, Agent, or Firm*—Larry W. Miller; John William Stader

(57) ABSTRACT

A hydraulic valve having a main body in which is formed a pressurized-fluid inlet opening; a first conduit communicating hydraulically with a user device; a second conduit communicating hydraulically with the user device, and at least one spool for regulating pressurized fluid flow to and from the user device; the spool having a longitudinal axis, and the position of the spool being regulated by an actuating device; the hydraulic valve being characterized in that the actuating device has a guide member for preventing the spool from rotating about the axis; the actuating device also having a cable, e.g. a Bowden-type cable, for moving the spool in two opposite directions defined by the longitudinal axis.

11 Claims, 2 Drawing Sheets

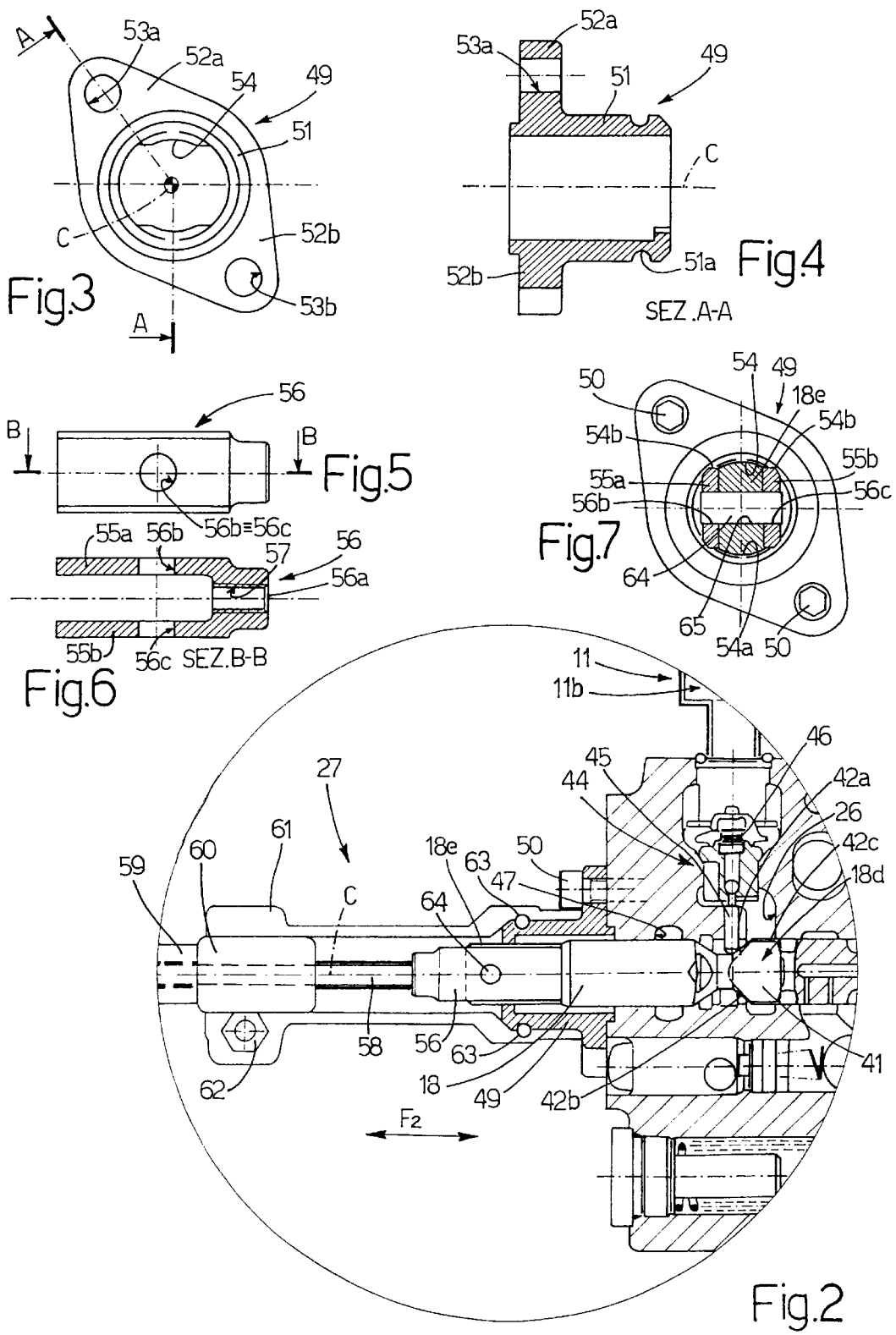

HYDRAULIC CONTROL VALVE FOR AGRICULTURAL IMPLEMENTS

FIELD OF THE INVENTION

The present invention relates generally to hydraulic control valves, and more specifically to a hydraulic control valve for activating a double-acting hydraulic cylinder on a tractor or similar vehicle.

BACKGROUND OF THE INVENTION

Hydraulic circuits, particularly on farm tractors, are known to feature at least one control valve operated manually by the user to regulate the flow of pressurised hydraulic fluid to and from a double-acting cylinder. Control valves of this sort are often "packed" together to form a control valve assembly, supplied from the same pressurised fluid source, and can activate different user devices separately as required by the operator. For example, a typical control valve assembly comprises one or a number of stacked valves enclosed by two end plates; the hydraulic valves and end plates forming the pack are held together in a fluid-tight manner by bolts having threaded ends to which respective nuts are attached. Normally, each valve has a manually operated lever mechanism designed to move a spool in two opposite directions defined by the longitudinal axis of the spool so as to open and close conduits hydraulically connected to the user device. In some embodiments, the spool, at least along a portion of its line of travel, may activate at least one non-return valve by cam means forming part of the spool, and between which the spool may comprise two flat faces for increasing outflow of the pressurised fluid to and from the user device.

It is therefore essential that, during its travel the spool be prevented from rotating unintentionally about its longitudinal axis, in which case, the cam means would be unable to act on the stem of the non-return valve, on account of one of the two flat faces—which does not constitute a valid ramp for opening the non-return valve—being positioned facing the end of the spring-loaded valve stem. As this would result in jamming of the control valve, prior art control valves use lever mechanisms that provide for both moving and preventing unintentional rotation of the spool.

In actual use, however, such lever mechanisms have proved fairly bulky, and can only be operated by a lever close to the valve itself.

SUMMARY OF THE INVENTION

Accordingly, it is an object of the present invention to eliminate the lever mechanism activating the spool of a hydraulic valve, and to adopt instead a cable actuator, in particular a Bowden cable, that substantially comprises a wire enclosed inside a casing in which the wire can slide when pulled or pushed by the operator.

Another object of the present invention is to provide a novel control valve that may be remotely operated, e.g. from the driver's seat of a tractor.

These and other objects, features and advantages are accomplished according to the instant invention by providing a hydraulic control valve comprising a main body in which is formed a pressurised-fluid inlet opening; first and second conduits in fluid flow communication with a user device; and at least one spool for regulating pressurised fluid flow to and from the user device. The spool has a longitudinal axis, and the position of the spool is regulated by an actuating device, the hydraulic valve being characterised in that the actuating device comprises guide means for preventing the spool from rotating about its axis. The actuating device comprises wire means for moving the spool in two opposite directions defined by its longitudinal axis.

DESCRIPTION OF THE DRAWINGS

FIG. 2 shows an enlargement of a portion of FIG. 1;

FIG. 3 shows a first detail of the FIGS. 1 and 2 valve;

FIG. 4 shows a sectional view taken along line A—A of FIG. 3;

FIG. 5 shows a second detail of the FIGS. 1 and 2 valve;

FIG. 6 shows a sectional view taken along line B—B of FIG. 5;

FIG. 7 shows a number of assembled parts of the FIGS. 1 and 2 valve.

DESCRIPTION OF THE PREFERRED EMBODIMENT

Figure 1:
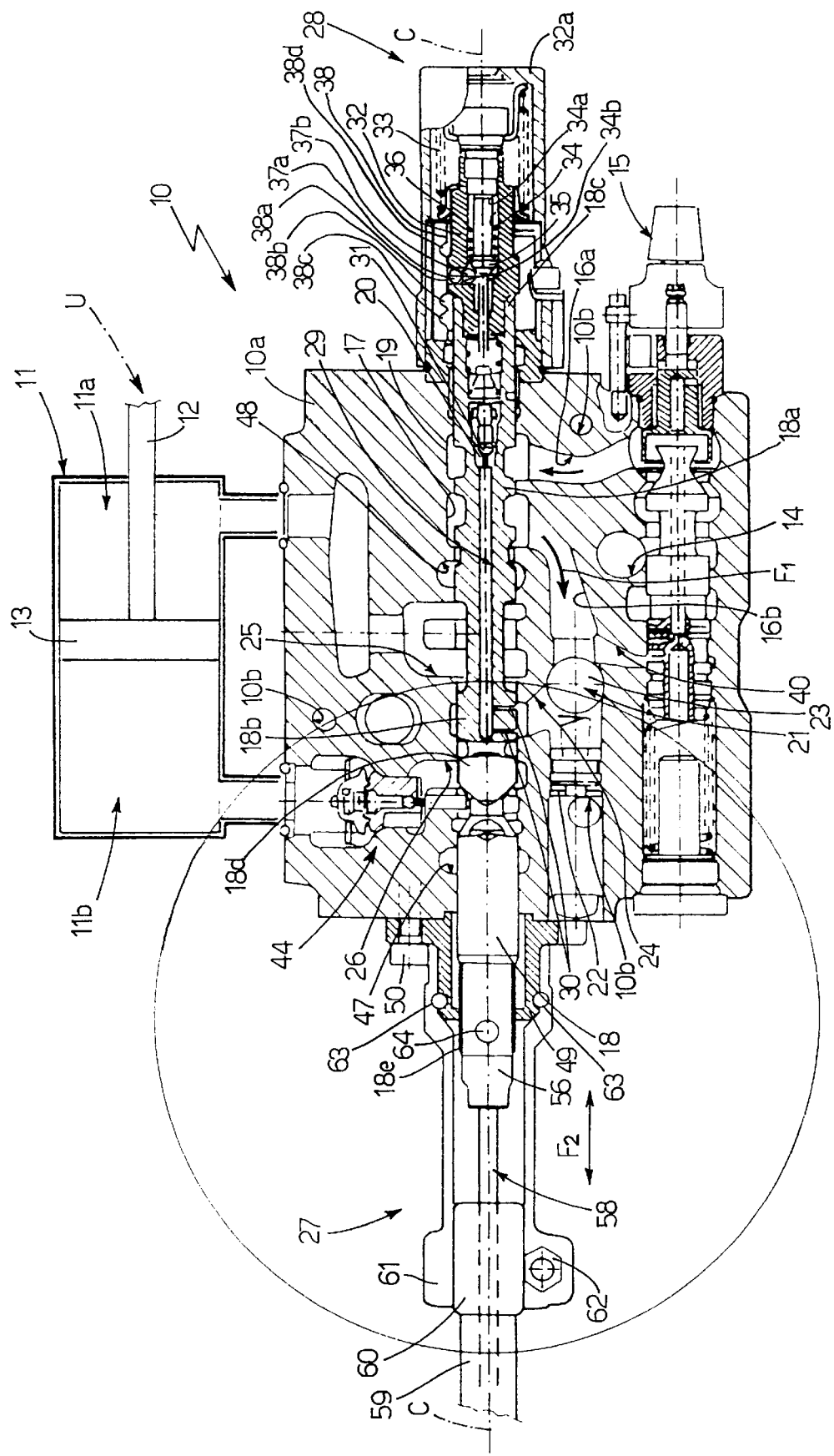
FIG. 1 shows a longitudinal section of a hydraulic control valve in accordance with the present invention.

Referring to the drawings for a detailed description of the preferred embodiment of the present invention, particularly FIGS. 1 and 2, show a cross-sectional view of valve 10. Since, as regards the function of regulating pressurised fluid flow for controlling a user device—in this case a double-acting cylinder 11—control valve 10 is substantially similar to those commonly used in this type of application.

FIG. 1 shows a valve 10 of the 4/4 type, i.e., a valve that controls four attachments and uses four positions of the spool of valve 10. A rod 12 of piston 13 of cylinder 11 is connected mechanically to a user device U.

More specifically, valve 10 can assume a first "locked central neutral" position in which piston 13 moves in neither direction when subjected to external force; a second position in which piston 13 moves leftwards; a third position in which the piston moves rightwards; and a fourth position in which piston 13 is "floating", i.e. can move right- or left depending on the direction of the force applied to rod 12.

Valve 10 substantially comprises a main body 10a having internal channels for the passage of pressurised hydraulic fluid for the functions described in detail below.

Main body 10a comprises a series of through holes 10b through which, as stated, respective ties (not shown) are fitted in use to "pack" together the various valves and end plates (not shown).

Main body 10a has an opening 14 through which pressurised fluid is supplied from a header (not shown) which simultaneously supplies all the hydraulic valves (not shown) "packed" to form a control valve assembly. Opening 14 has a screw adjusting device 15 for adjusting pressurised fluid flow to valve 10, and is connected hydraulically to a conduit 16a for supplying a central distribution seat 17 in which slides a spool 18. The usual tolerances apply to spool 18 and seat 17 to ensure smooth sliding of the spool with respect to the seat while at the same time minimising leakage of the pressurised fluid.

Conduit 16a comes out inside a chamber 19 in central seat 17. Together with a sector 18a of spool 18, chamber 19 forms a choke 20 for regulating fluid flow, which, following the path indicated by arrow F1, flows along a conduit 16b to a non-return valve 21. On overcoming the resistance of a spring 22 on a ball 23 of valve 21, the pressurised fluid flows into an inlet conduit 24 and back into central distribution seat 17.

A sector 18b of spool 18 is positioned astride conduit 24 and, in the "locked central neutral" position shown in FIG. 1, prevents pressurised fluid flow into both conduit 25 supplying chamber 11a of cylinder 11 and conduit 26 supplying chamber 11b of cylinder 11 and separated from chamber 11a by piston 13.

As shown in FIGS. 1 and 2, spool 18 is movable in two opposite directions, indicated by the two-way arrow F2 and defined by the longitudinal axis C of the spool, to switch valve 10 and so activate cylinder 11 as required. Spool 18 is movable by means of an actuating device 27, operation of which is described in detail later on; and a device 28 for engaging and releasing spool 18 is located at the opposite end of actuating device 27, on the opposite side of main body 10a.

A channel 29 extends longitudinally through spool 18 along axis C, and is connected hydraulically to conduit 24 by two small holes 30 perpendicular to axis C, so that, for any position assumed by sector 18b along axis C, there is always one hole 30 connected hydraulically to one of conduits 24, 25, or 26.

In actual use, the pressurised fluid, first flowing through at least one hole 30 and along channel 29, opens a valve 31 calibrated to a predetermined fluid pressure. Device 28 also comprises a hollow bushing 32 fitted integrally to spool 18 by a threaded fastener 18c held in the "locked central neutral" position by a spring 33. Bushing 32 comprises a channel 34 coaxial with axis C, and is occupied partly by a piston 35 subjected to the elastic action of a spring 36. Bushing 32 has three holes 34b (only one shown in FIG. 1) equally spaced 120° apart and substantially perpendicular to axis C, and each of which houses two balls 37a and 37b placed freely one on top of the other. Being subjected to the elastic action of spring 36 via conical piston 35, the bottom ball 37b keeps the top ball 37a resting against an inner surface 38 of bushing 32, which surface comprises a flat portion 38a and three seats 38b–38d for the purpose explained in detail below. When the top ball 37a is located in either of seats 38b or 38d, rightward activation of piston 35—the conical surface of which, as stated, acts on bottom ball 37b—moves device 28 into a release position, thus enabling spool 18 to slide in both directions indicated by two-way arrow F2 and back into the "locked central neutral" position.

A passage 40 is provided upstream from valve 21, and hydraulically connects conduit 16b to adjusting device 15 to retroactively control in known manner the extent to which device 15 is opened.

Spool 18 also comprises a sector 18d adjacent to sector 18b and having (FIG. 2) two flat faces 41 (only one shown) and two ramps 42a and 42b substantially in the form of truncated-cone sectors. Conduit 26 for supplying chamber 11b of cylinder 11 is located over sector 18d, and the free outflow of pressurised fluid from chamber 11b to seat 17 is normally cut off by a non-return valve 44, the stem 45 of which rests on spool 18 and is loaded elastically in known manner by a spring 46. Stem 45 and ramp 42a form cam means for opening and closing valve 44.

It should be pointed out that the two faces 41 of sector 18d are flat to permit greater pressurised fluid flow from seat 17 to and from chamber 11b of cylinder 11 along conduit 26.

In actual use, cylinder 13 is moved leftwards by simply pulling spool 18 leftwards by means of device 27, so as to hydraulically connect conduits 24 and 25 to supply chamber 11a of cylinder 11. By increasing the amount of pressurised fluid in chamber 11a, piston 13 is moved leftwards as required. Since chamber 11b is also full of fluid, however, to enable piston 13 to move leftwards, the fluid in chamber 11b must be allowed to flow freely along conduit 26 to a drain 47, which means valve 44 must be open. For this reason, as spool 18 moves leftwards, ramp 42a of sector 18d of spool 18 raises stem 45, in opposition to spring 46 and the pressure created in chamber 11b, to allow the fluid in chamber 11b to flow into drain 47. At the same time, bushing 32 also moves leftwards, so that ball 37a engages seat 38b to "click" bushing 32 and spool 18 together. Bushing 32 is held in position by ball 37a inside seat 38b and by preloading spring 33, one end of which is integral with bushing 32, and the other end of which is fixed to a cover 32a.

As stated, valve 31 inside spool 18 is calibrated to only let through fluid over and above a given pressure threshold. If the fluid pressure in chamber 11a exceeds the set threshold, piston 35 is moved, as already seen, so that ball 37a is dislodged from seat 38b and brought to rest against flat portion 38a by the load on spring 33, which returns to the normal position, so that spool 18 returns to the "locked central neutral" position. If, with ball 37a inside seat 38b, spool 18 is pulled further leftwards by means of device 27, ball 37a moves into seat 38c into the "floating" operation position, i.e. in which conduit 26 is connected hydraulically to drain 47, and conduit 25 drains off the fluid via a drain 48 (FIG. 1).

In the "floating" operation mode, piston 13 is allowed to move freely both right- and leftwards under an external load applied by user device U on rod 12. In this case, the end of stem 45 of valve 44 rests on the cylindrical surface 42c of sector 18d (FIG. 2).

Conversely, to move piston 13 rightwards, spool 18 is simply moved rightwards, as indicated by arrow F2, so that conduit 24 communicates hydraulically with conduit 26. In this case, the pressure of the fluid itself lifts nonreturn valve 44 to supply chamber 11b of cylinder 11, and the fluid in chamber 11a is drained off by conduit 25 and drain 48.

The two flat faces 41 (only one shown in FIG. 2) of sector 18d are provided to increase fluid flow from seat 17 to and from conduit 26, while the active part of sector 18d is defined by ramp 42a. If, for any reason, spool 18 were to rotate even only slightly about axis C, the end of stem 45 of valve 44 would no longer contact ramp 42a or surface 42c, as it should for valve 44 to be opened correctly, but would rest on one of the two flat faces 41 of sector 18d. Undesired rotation of spool 18 about axis C would therefore result in a practically irreparable breakdown of valve 10. To prevent this, it is therefore essential that spool 18 be prevented from rotating unintentionally about axis C when effecting any movement in the direction of arrow F2, and also when device 28 is removed and reassembled.

It is also extremely important that spool 18 be activatable some distance from valve 10, e.g. from the driver's cab (not shown). A particularly interesting solution is to activate the spool via a cable, e.g. a Bowden cable, which would greatly increase the "flexibility" of device 27 activating spool 18.

For which reason, an inventive actuating device 27 has been provided. This substantially comprises a bushing 49 (FIGS. 3, 4) fixed by two bolts 50 (only one shown in FIGS. 1 and, 2) to main body 10a.

As shown in more detail in FIGS. 3 and 4, bushing 49 comprises a bushing 51 having two integral spokes 52a and 52b, each having a respective through hole 53a and 53b for receiving a respective bolt 50. As shown in FIGS. 1–4, bushing 49 is perfectly aligned with axis C.

As shown in FIG. 3, bushing 51 is substantially cylindrical and has an inner profile 54 for receiving the two prongs 55a and 55b of a fork 56 (FIGS. 5 and 6), so that fork 56 is only permitted to move in the two directions defined by arrow F2.

A groove 51a is formed on the outer cylindrical surface of bushing 51 for the purpose explained below.

One end 56a of fork 56 has a threaded hole 57 in which can be fitted in known manner a metal wire 58 forming part of an actuating, e.g. Bowden-type, cable 59 (FIG. 2). As is known, Bowden cable 59 comprises wire 58 enclosed in a casing 60 of plastic material; and a metal or plastic terminal. As shown in FIG. 2, casing 60 is fixed to a support 61 by a known fastening device indicated generally as 62.

Support 61 is fixed to bushing 49 by two pins (not shown in FIG. 2) inserted inside two holes 63 in support 61 and inside groove 51a on bushing 51 (FIG. 4).

As shown in FIG. 7, prongs 55a and 55b of fork 56 enclose a flat end 18e of spool 18; which end 18e is fixed to fork 56 by a pin 64 fitted through holes 56b and 56c formed in prongs 55a and 55b (FIG. 6), and through a hole 65 formed in end 18e of spool 18. As shown in FIG. 7, profile 54 comprises a central circular portion 54a for housing end 18e of spool 18; and two outer portions 54b shaped according to the outer configuration of prongs 55a and 55b of fork 56. Device 27 according to the present invention therefore provides for remote operation of spool 18 by means of cable 59 while at the same time preventing the moving spool 18 from rotating about axis C. As such, spool 18 can be remotely operated reliably with no risk of valve 10 jamming due, as stated, to spool 18 rotating unintentionally about longitudinal axis C.

Assembly of device 27 is easily deducible from the foregoing description. More specifically, bushing 49 is first fitted to main body 10a by means of bolts 50; fork 56 is fitted to the end of wire 58 using known means not shown; fork 56 (integral with cable 59) is inserted through the left-hand hole in support 61 so as to project from the right-hand side; fork 56 is fitted to end 18e of spool 18, and pin 64 inserted through aligned holes 56b, 65, and 56c; support 61 and bushing 49 are brought together; holes 63 are aligned with groove 51a on bushing 51, and the pins (not shown) are inserted to fix support 61 to bushing 49, while allowing support 61 to rotate into place about axis C with respect to bushing 49. Once support 61 is fixed to bushing 49, casing 60 of cable 59 is fastened to support 61 using known fastening device 62.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. A hydraulic control valve comprising a main body in which is formed a pressurized-fluid inlet opening; first and second conduits communicating hydraulically with a user device; and at least one spool for regulating pressurized fluid flow to and from said user device; said spool having a longitudinal axis, the position of the spool being regulated by an actuating device; the improvement comprising:

said actuating device including guide means associated with said spool and said main body for preventing said spool from rotating about said longitudinal axis; said actuating device also comprising wire means affixed to said spool for moving it in two opposite directions defined by said longitudinal axis, said guide means including a bushing made integral with said main body and a fork shaped member affixed to both one end of said spool and one end of said wire means.

2. The hydraulic control valve of claim 1, wherein said fork-shaped member comprises two prongs which, in use, enclose said one end of said spool.

3. The hydraulic control valve of claim 2, wherein said bushing has an inner guide profile shaped to allow said prongs and said one end to slide with respect to said bushing.

4. The hydraulic control valve of claim 3, wherein said user device is a double-acting cylinder having a piston with first and second chambers, respectively, on either side of said piston, said first conduit in fluid communication with said first chamber and said second conduit in fluid communication with said second chamber.

5. The hydraulic control valve of claim 4, wherein a non-return valve is arranged to close said first conduit supplying fluid to said first chamber of said cylinder.

6. The hydraulic control valve of claim 5, wherein said spool includes at least one ramp for activating said non-return valve, and two flat faces for increasing fluid flow to and from the respective first and second chambers of said cylinder.

7. The hydraulic control valve of claim 6, wherein said wire means comprise a bowden type cable in turn comprising an inner metal wire, an outer casing made of plastic material, and a metal or plastic terminal.

8. The hydraulic control valve of claim 7, wherein said casing is fixed to a support by fastening means; said support being integral with said guide means.

9. The hydraulic control valve of claim 8, wherein an engaging and release device is associated with one end of said spool.

10. The hydraulic control valve of claim 9, wherein said engaging and release device is assembled and removed without acting on said actuating device and/or said spool.

11. The hydraulic control valve of claim 10, wherein said engaging and release device is assembled and removed without inducing unintentional rotation of said spool.

* * * * *